United States Patent [19]
Hyuga et al.

[11] Patent Number: 5,243,611
[45] Date of Patent: Sep. 7, 1993

[54] OPTICAL WAVELENGTH CONVERTING APPARATUS

[75] Inventors: Hiroaki Hyuga; Yoji Okazaki, both of Kanagawa, Japan

[73] Assignee: Fuji Photo Film Co., Ltd., Kanagawa, Japan

[21] Appl. No.: 878,466

[22] Filed: May 5, 1992

[30] Foreign Application Priority Data

May 10, 1991 [JP] Japan .................. 3-105431
Oct. 14, 1991 [JP] Japan .................. 3-264722

[51] Int. Cl.$^5$ .............................................. H01S 3/10
[52] U.S. Cl. .................... 372/22; 359/328; 372/105; 372/34
[58] Field of Search ............. 359/326, 328; 372/21, 372/22, 105, 106, 34

[56] References Cited

U.S. PATENT DOCUMENTS

| | | | |
|---|---|---|---|
| 4,656,635 | 4/1987 | Baer et al. | 372/27 |
| 4,701,929 | 10/1987 | Baer et al. | 372/21 |
| 5,130,996 | 7/1992 | Amano et al. | 372/21 |
| 5,191,588 | 3/1993 | Dacquay | 372/22 |

FOREIGN PATENT DOCUMENTS

1-220879 9/1989 Japan .
3-49278 3/1991 Japan .

OTHER PUBLICATIONS

A. Yariv, "Introduction to Optical Electronics", *Fundamental of Optoelectronics*, pp. 200–204 translated by K. Tada & T. Kamiya, Copyright ©1971 by Holt, Rinehart and Winston, Inc.

Yao et al., "Calculations of Optimum Phase Match Parameters for the Biaxial Crystal KTioPO$_4$", *J. Appl. Phys.*, vol. 55, p. 65, (Jan. 1984).

Oka et al., "Stable Intractivity Doubling of Orthogonal Linearly Polarized Modes in Diode-Pumped ND:YAG Lasers", *Optics Letters*, vol. 13, p. 805, Oct. 1988.

*Primary Examiner*—James W. Davie
*Attorney, Agent, or Firm*—Sughrue, Mion, Zinn, Macpeak & Seas

[57] ABSTRACT

In an optical wavelength converting apparatus, a laser beam serving as a fundamental wave and having been obtained by pumping a solid laser medium is caused to impinge upon a nonlinear optical crystal, and the type II of phase matching between the fundamental wave and its second harmonic is effected. The second harmonic of the fundamental wave is thereby radiated out of the optical wavelength converting apparatus. A solid laser medium, which produces a linearly polarized fundamental wave in two longitudinal modes, is employed as the solid laser medium. A device for adjusting a difference in phase of the fundamental wave due to the nonlinear optical crystal and a device for adjusting the temperatures of the nonlinear optical crystal and a resonator, such that the temperatures may be kept at predetermined values, are provided in order to work such that two directions of polarization of the fundamental wave may intersect approximately perpendicularly to each other and may respectively incline approximately 45° with respect to an optic axis of the nonlinear optical crystal. The second harmonic having stable output power and free of any noise is thus obtained.

11 Claims, 5 Drawing Sheets

OPTICAL WAVELENGTH CONVERTING APPARATUS

BACKGROUND OF THE INVENTION

1. Field of the Invention

This invention relates to an optical wavelength converting apparatus for converting a fundamental wave into its second harmonic. This invention particularly relates to an optical wavelength converting apparatus, wherein a crystal of a nonlinear optical material, with which the type II of phase matching between a fundamental wave and its second harmonic is effected, is utilized.

2. Description of the Prior Art

Various attempts have heretofore been made to convert the fundamental wave of a laser beam into its second harmonic, e.g. to shorten the wavelength of a laser beam, by using a nonlinear optical material. As an optical wavelength converting apparatus for carrying out such wavelength conversion, there has heretofore been known a bulk crystal type of optical wavelength converting apparatus as described in, for example, "Hikari Electronics No Kiso" (Fundamentals of Optoelectronics) by A. Yariv, translated by Kunio Tada and Takeshi Kamiya, Maruzen K. K., pp. 200-204.

As the crystal of the nonlinear optical material, a biaxial crystal, such as a KTP crystal, is often employed. How to effect the phase matching with a KTP biaxial crystal is described in detail by Yao, et al. in J. Appl. Phys., Vol. 55, p. 65, 1984. The method for effecting the phase matching with a biaxial crystal will be described hereinbelow.

With reference to FIG. 4, the direction, along which a fundamental wave travels, and the optic axis Z of the crystal make an angle $\theta$. The projection of the direction, along which the fundamental wave travels, onto the plane, in which the optic axes X and Y lie, and the optic axis X make an angle $\phi$. The refractive index of the crystal with respect to the fundamental wave, which impinges upon the crystal at an arbitrary angle of incidence, and the refractive index of the crystal with respect to the second harmonic of the fundamental wave are represented respectively by $$n^\omega, n^{2\omega} \quad (1)$$

The refractive indexes of the crystal with respect to the light components of the fundamental wave, which have been polarized respectively in the X, Y, and Z optic axis directions, and the refractive indexes of the crystal with respect to the light components of the second harmonic, which have been polarized respectively in the X, Y, and Z optic axis directions, are represented by $$n^\omega_X, n^\omega_Y, n^\omega_Z, n^{2\omega}_X, n^{2\omega}_Y, n^{2\omega}_X \quad (2)$$

When $k_x$, $k_y$, and $k_z$, are defined as follows:
$k_x = \sin\theta \cdot \cos\phi$
$k_y = \sin\theta \cdot \sin\phi$
$k_z = \cos\theta$
the following formulas obtain:

$$\frac{k_X^2}{(n^\omega)^{-2} - (n^\omega_X)^{-2}} + \frac{k_Y^2}{(n^\omega)^{-2} - (n^\omega_Y)^{-2}} + \quad (3)$$

$$\frac{k_Z^2}{(n^\omega)^{-2} - (n^\omega_Z)^{-2}} = 0$$

$$\frac{k_X^2}{(n^{2\omega})^{-2} - (n^{2\omega}_X)^{-2}} + \frac{k_Y^2}{(n^{2\omega})^{-2} - (n^{2\omega}_Y)^{-2}} + \quad (4)$$

$$\frac{k_Z^2}{(n^{2\omega})^{-2} - (n^{2\omega}_Z)^{-2}} = 0$$

Solutions of Formulas (3) and (4) represent the conditions under which the phase matching can be effected. When B1, C1, B2, and C2 are defined as follows:

$$B_1 = -k_X^2(b_1 + c_1) - k_Y^2(a_1 + c_1) - k_Z^2(a_1 + b_1) \quad (5)$$
$$C_1 = k_X^2 b_1 c_1 + k_Y^2 a_1 c_1 + k_Z^2 a_1 b_1$$
$$B_2 = -k_X^2(b_2 + c_2) - k_Y^2(a_2 + c_2) - k_Z^2(a_2 + b_2)$$
$$C_2 = k_X^2 b_2 c_2 + k_Y^2 a_2 c_2 + k_Z^2 a_2 b_2$$

$$a_1 = (n^\omega_X)^{-2} \quad a_2 = (n^{2\omega}_X)^{-2}$$
$$b_1 = (n^\omega_Y)^{-2} \quad b_2 = (n^{2\omega}_Y)^{-2}$$
$$c_1 = (n^\omega_Z)^{-2} \quad c_2 = (n^{2\omega}_Z)^{-2}$$

the solutions of Formulas (3) and (4) are represented by the formulas $$n^\omega, i = \frac{\sqrt{2}}{\sqrt{-B_1 \pm \sqrt{-B_1 - 4C_1}}} \quad (6)$$

$$n^{2\omega}, i = \frac{\sqrt{2}}{\sqrt{-B_2 \pm \sqrt{-B_2 - 4C_2}}} \quad (7)$$

(Double signs: + when $i = 1$, and − when $i = 2$)

When the condition $$n^\omega, 2 = n^{2\omega}, i \quad (8)$$

is satisfied, the phase matching between the fundamental wave and its second harmonic is effected. Such phase matching is referred to as the type I of phase matching.

Also, when the condition $$\tfrac{1}{2}(n^\omega, 1 + n^\omega, 2) = n^{2\omega}, 1 \quad (9)$$

is satisfied, the phase matching between the fundamental wave and its second harmonic is effected. Such phase matching is referred to as the type II of phase matching.

In cases where the type II of phase matching is effected with a biaxial crystal, the fundamental wave impinging upon the crystal is subjected to two refractive indexes of the crystal. By way of example, the nonlinear optical constant d24 of the crystal may be utilized. Specifically, as illustrated in FIG. 5, a fundamental wave 11, which has been polarized linearly in the direction indicated by the double headed arrow P, may be introduced into a crystal 10. The direction indicated by the double headed arrow P inclines at an angle of 45° from the Y optic axis of the crystal 10 towards the Z axis of the crystal 10. (The fundamental wave 11 comprises the linearly polarized light component in the Y axis direction and the linearly polarized light component in the Z axis direction.) In this manner, a second harmonic 12, which has been polarized linearly in the Y axis direction, may be obtained from the crystal 10. In such cases, the linearly polarized light component of the fundamental wave 11 in the Z axis direction is subjected to a refractive index $$n^\omega, 1 \qquad (10)$$

Also, the linearly polarized light component of the fundamental wave 11 in the Y' direction, which direction is normal to the direction of travel of the fundamental wave 11 and to the Z axis, is subjected to a refractive index $$n^\omega, 2 \qquad (11)$$

Thus the fundamental wave 11 is subjected to the two refractive indexes.

Strictly speaking, in cases where the crystal 10 has been cut into the shape shown in FIG. 5, the fundamental wave 11 impinges upon the crystal 10 such that it has been polarized linearly in the Y' direction (which inclines from the Y axis towards the X axis) and in the Z axis direction. The second harmonic 12 is obtained as light which has been polarized in the Y' direction. However, practically, no problem occurs when consideration is made in the manner described above.

Japanese Unexamined Patent Publication No. 1(1989)-220879 indicates that, in cases where Nd:YAG is used as a solid laser medium in order to produce an unpolarized laser beam from the solid laser oscillation, and a nonlinear optical crystal, which effects the type II of phase matching, is located in the region inside of a resonator in order to yield a wavelength-converted laser beam, longitudinal mode competition occurs between polarization modes, so that much noise may occur in the wavelength-converted laser beam which is thus outputted. This publication also describes that noise in the output can be reduced by inserting a quarter-wave plate at an appropriate angle into the region inside of the resonator.

Also, U.S. Pat. Nos. 4,656,635 and 4,701,929 disclose that, in cases where Nd:YAG is used as a solid laser medium in order to produce an unpolarized laser beam from the solid laser oscillation, noise in the output can be reduced by eliminating spatial hole-burning in the solid laser medium. These publications indicate that noise in the output can be reduced by, for example, utilizing a ring laser resonator or locating the solid laser medium between a pair of quarter-wave plates.

Additionally, Japanese Unexamined Patent Publication No. 3(1991)-49278 discloses a technique wherein, in cases where Nd:YAG is used as a solid laser medium and an unpolarized laser beam is produced from the solid laser oscillation in the longitudinal multimode, noise in the output can be reduced by keeping the temperature of a resonator, in which the solid laser medium is located between a pair of quarter-wave plates, at a specific value.

Further, in Optics Letters, 13, p. 805, (1988), relationship between directions of polarization in two longitudinal modes and mode stability, which relationship is obtained when a laser beam is produced by a solid laser medium from the solid laser oscillation in two longitudinal modes and is caused to impinge as a fundamental wave upon a nonlinear optical crystal which effects wavelength conversion. Specifically, in this literature, it is reported that, as illustrated in FIG. 6, in cases where the direction of polarization in a first longitudinal mode and the direction of polarization in a second longitudinal mode incline 45° with respect to an optic axis of the nonlinear optical crystal and the two directions of polarization intersect perpendicularly to each other, the formula $$P_{SHG} = \tfrac{1}{2} d_{\text{eff}}^2 (P_1^2 + P_2^2)$$

obtains, wherein deff represents the effective nonlinear optical constant, P1 represents the intensity of the first longitudinal mode, and P2 represents the intensity of the second longitudinal mode. Therefore, the first longitudinal mode and the second longitudinal mode are stable, and no mode coupling occurs therebetween.

Therefore, as indicated in the literature cited above, various attempts have heretofore been made to set by using a means for adjusting a difference in phase, such as a quarter-wave plate, such that directions of polarization in two longitudinal modes may intersect perpendicularly to each other and may respectively incline 45° with respect to an optic axis of a nonlinear optical crystal.

However, with conventional optical wavelength converting apparatuses, even if a means for adjusting a difference in phase is utilized, drift and noise inevitably occur in wavelength-converted waves which are outputted from the optical wavelength converting apparatuses.

SUMMARY OF THE INVENTION

The primary object of the present invention is to provide an optical wavelength converting apparatus, wherein a nonlinear optical crystal, with which the type II of phase matching between a fundamental wave and its second harmonic is effected, is utilized, and wherein the second harmonic having stable output power and free of any noise is obtained.

Another object of the present invention is to provide an optical wavelength converting apparatus, with which a second harmonic having high output power is obtained.

The present invention provides an optical wavelength converting apparatus in which a laser beam serving as a fundamental wave and having been obtained by pumping a solid laser medium is caused to impinge upon a nonlinear optical crystal, the type II of phase matching between the fundamental wave and its second harmonic is effected, and the second harmonic of the fundamental wave is thereby radiated out of the optical wavelength converting apparatus, wherein a solid laser medium, which produces a linearly polarized fundamental wave in two longitudinal modes, is employed as said solid laser medium, and a means for adjusting a difference in phase of said fundamental wave due to said nonlinear optical crystal and a means for adjusting the temperatures of said nonlinear optical crystal and a resonator, such that said temperatures may be kept at predetermined values, are provided in order to work such that two directions of polarization of said fundamental wave may intersect approximately perpendicularly to each other and may respectively incline approximately 45° with respect to an optic axis of said nonlinear optical crystal.

As the solid laser medium for producing the fundamental wave in the manner defined above, for example, a YVO$_4$ crystal doped with approximately 1 to 2 at % of neodymium (Nd) may be employed.

In cases where wavelength conversion is carried out by using a nonlinear optical crystal, which effects the type II of phase matching, a fundamental wave, which has been polarized linearly in one direction, is subjected to two refractive indexes. If the fundamental wave is subjected to two refractive indexes, a phase difference $\Delta$ will occur between the polarized light components, which are subjected to different refractive indexes. The phase difference $\Delta$ is represented by the formula $$\Delta = (n^\omega, 2 - n^\omega 1) L \cdot 2\pi/\lambda \tag{12}$$

where $\lambda$ represents the wavelength of the fundamental wave, and L represents the length of the crystal. The length, L, of the crystal is the effective length, i.e., the length of the optical path of the fundamental wave in the crystal. If the phase difference $\Delta$ occurs, the direction of polarization of the fundamental wave will change in accordance with the value of the phase difference $\Delta$.

Therefore, with the optical wavelength converting apparatus in accordance with the present invention, the two directions of polarization of the fundamental wave can be set by operating the means for adjusting a difference in phase, such that they may intersect approximately perpendicularly to each other and may respectively incline approximately 45° with respect to an optic axis of the nonlinear optical crystal. Accordingly, longitudinal mode competition can be reduced, and a second harmonic free of any noise can be obtained.

Also, with the optical wavelength converting apparatus in accordance with the present invention, the temperature of the nonlinear optical crystal is adjusted such that it may be kept at a predetermined value. Therefore, problems can be prevented from occurring in that the nonlinear optical crystal, whose refractive index ordinarily depends comparatively largely upon temperature, is adversely affected by a change in ambient temperature and, as a result, the refractive indexes $$n^\omega, 2 \text{ and } n^\omega, 1 \tag{13}$$

and the phase difference $\Delta$ change. In this manner, the two directions of polarization of the fundamental wave can be reliably set at those defined above. Additionally, with the optical wavelength converting apparatus in accordance with the present invention, the temperature of the resonator is adjusted such that it may be kept at a predetermined value. Therefore, the resonator length can be kept at a predetermined length, and no change occurs in the wavelength and the directions of polarization of the fundamental wave in the longitudinal modes. These features also contribute to the effects that the two directions of polarization of the fundamental wave can be reliably set at those defined above.

With conventional optical wavelength converting apparatuses, the temperatures of a nonlinear optical crystal and a resonator are not adjusted such that they may be kept at predetermined values. It is considered that, with conventional optical wavelength converting apparatuses, even if the phase difference $\Delta$ is adjusted, two directions of polarization of a fundamental wave or the phase shift amount of a quarter-wave plate fluctuate due to a change in ambient temperature, and such fluctuations cause longitudinal mode competition noise and drift to occur.

As described above, with the optical wavelength converting apparatus in accordance with the present invention, the directions of polarization of the fundamental wave are prevented from fluctuating due to a change in ambient temperature. Therefore, with the optical wavelength converting apparatus in accordance with the present invention, a second harmonic free of any noise can be obtained reliably.

Also, with the optical wavelength converting apparatus in accordance with the present invention, the two directions of polarization of the fundamental wave are set such that they may respectively incline approximately 45° with respect to an optic axis of the nonlinear optical crystal. Therefore, the nonlinear optical constant can be utilized efficiently, and a second harmonic having high output power can be obtained.

DESCRIPTION OF THE PREFERRED EMBODIMENTS

The present invention will hereinbelow be described in further detail with reference to the accompanying drawings.

Figure 1:
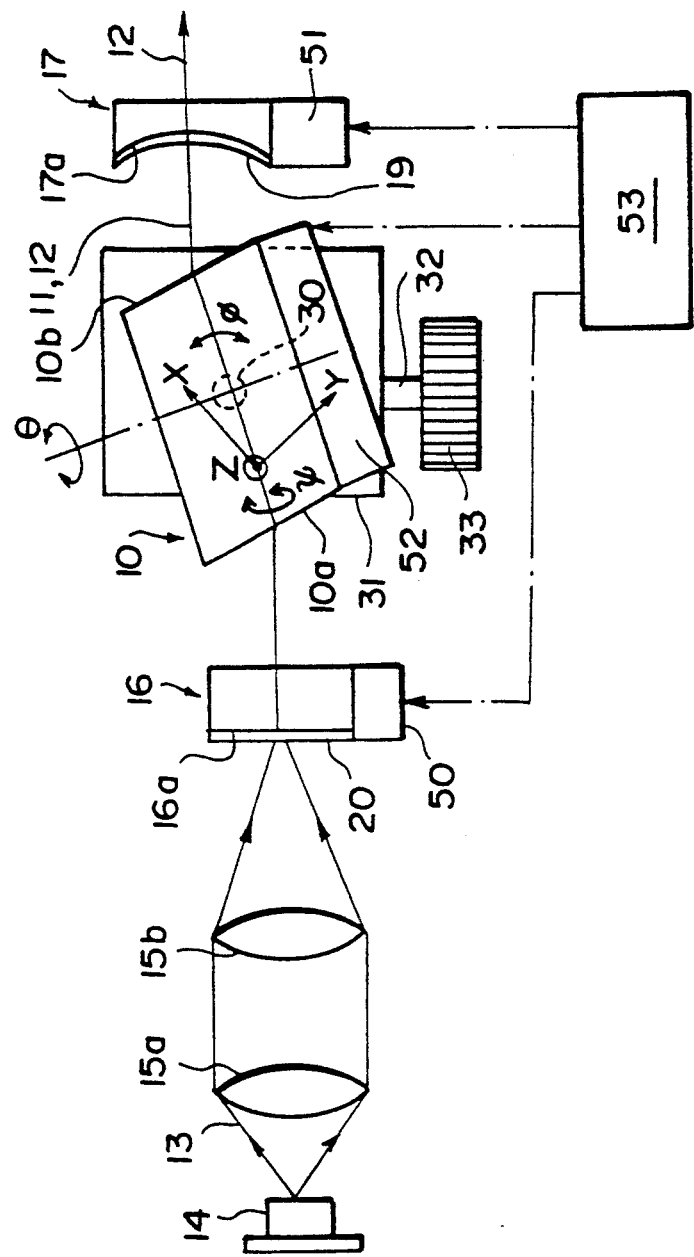
FIG. 1 is a side view showing a first embodiment of the optical wavelength converting apparatus in accordance with the present invention.

FIG. 1 shows a first embodiment of the optical wavelength converting apparatus in accordance with the present invention.

This embodiment comprises a semiconductor laser (a phased array laser) 14, which produces a laser beam 13 serving as a pumping beam, a collimator lens 15a for collimating the laser beam 13, which is a divergent beam, and a condensing lens 15b for condensing the laser beam 13, which has passed through the collimator lens 15a. This embodiment also comprises a YVO$_4$ rod 16, which is a solid laser rod doped with neodymium (Nd) in a proportion of, for example, 2 at %. (The YVO$_4$ rod, which is a solid laser rod doped with neodymium, will hereinafter be referred to as the Nd:YVO$_4$ rod.) This embodiment further comprises a resonator mirror 17, which is located on the side downstream from the Nd:YVO$_4$ rod 16, i.e. on the right side of the Nd:YVO$_4$ rod 16 in FIG. 1, and a KTP crystal 10, which is located between the Nd:YVO$_4$ rod 16 and the resonator mirror 17. These elements are mounted together with one another on a common case (not shown).

The temperature of the phased array laser 14 is set at a predetermined temperature by a Peltier device (not shown) and a temperature adjusting circuit (not shown). The Nd:YVO$_4$ rod 16 and the resonator mirror 17 constitute a resonator. The temperatures of the Nd:YVO$_4$ rod 16, the resonator mirror 17, and the KTP crystal 10 are set at predetermined temperatures respectively by Peltier devices 50, 51, and 52, which are connected to a temperature adjusting circuit 53.

The phased array laser 14 produces the laser beam 13 having a wavelength $\lambda 1$ of 809 nm. The neodymium atoms contained in the Nd:YVO$_4$ rod 16 are stimulated by the laser beam 13, and the Nd:YVO$_4$ rod 16 thereby produces a laser beam 11, which has been polarized linearly and has a wavelength $\lambda 2$ of 1,064 nm. The laser beam 11 is produced in two longitudinal modes.

A light input face 16a of the Nd:YVO$_4$ rod 16 is provided with a coating 20, which substantially reflects the laser beam 11 having the wavelength of 1,064 nm (with a reflectivity of at least 99.9%) and which substantially transmits the pumping laser beam 13 having the wavelength of 809 nm (with a transmittance of at least 99%). A face 17a of the resonator mirror 17, which face is located on the side of the KTP crystal 10, takes on the form of part of a spherical surface. The face 17a of the resonator mirror 17 is provided with a coating 19, which substantially reflects the laser beam 11 having the wavelength of 1,064 nm and the laser beam 13 having the wavelength of 809 nm and which substantially transmits a second harmonic 12 having a wavelength of 532 nm. Therefore, the laser beam 11 having the wavelength of 1,064 nm is confined between the face 16a and the face 17a, and laser oscillation is thereby caused to occur.

The laser beam 11 impinges upon the KTP crystal 10 of a nonlinear optical material, and is converted thereby into the second harmonic 12 having the wavelength, which is one half of the wavelength of the laser beam 11, i.e. is equal to 532 nm. Because the face 17a of the resonator mirror 17 is provided with the coating 19, approximately only the second harmonic 12 is radiated out of the resonator mirror 17.

Figure 6:
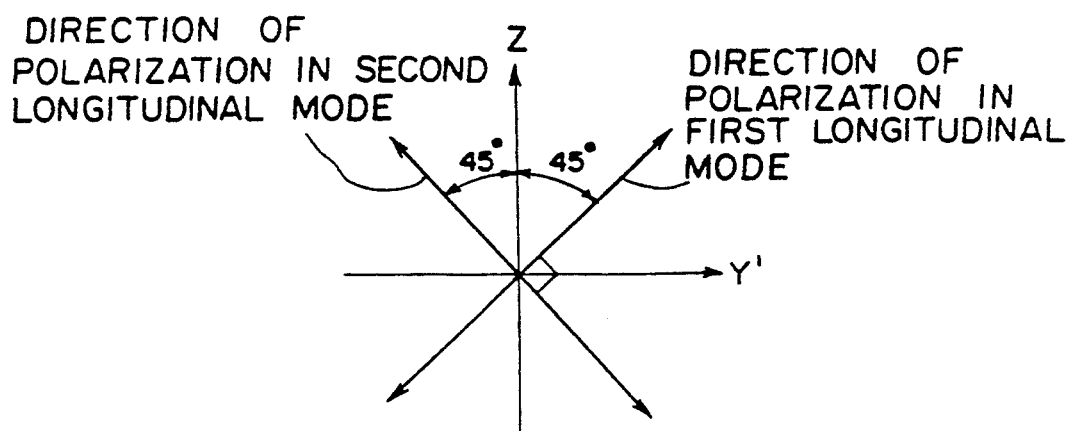
FIG. 6 is an explanatory view showing the relationship between directions of linear polarization of a fundamental wave in two longitudinal modes and optic axes of a nonlinear optical crystal in the optical wavelength converting apparatus in accordance with the present invention.
Figure 7:
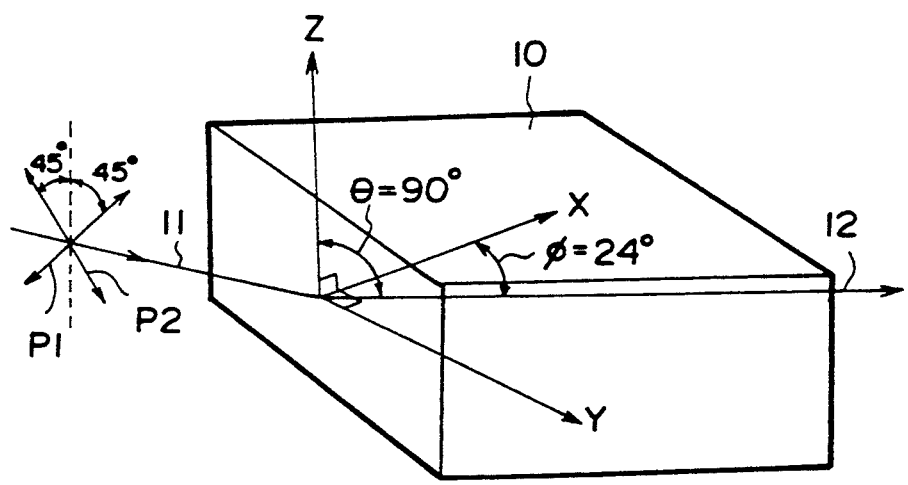
FIG. 7 is an explanatory view showing the relationship among the direction of travel of a fundamental wave, directions of linear polarization of the fundamental wave, and optic axes of a nonlinear optical crystal in the first embodiment of the optical wavelength converting apparatus in accordance with the present invention.

As illustrated in detail in FIG. 7, the KTP crystal 10, which is a biaxial crystal, is located such that the X axis may make an angle of $\phi = 24°$ with respect to the direction of incidence of the laser beam 11, which serves as the fundamental wave, and the Z axis may make an angle of $\theta = 90°$ with respect to the direction of incidence of the laser beam 11. With this configuration, in cases where the KTP crystal 10 is located such that each of the directions of linear polarization of the laser beam 11 in the two longitudinal modes, which directions are indicated by the double headed arrows P1 and P2, may make an angle of 45° with respect to the Z axis, a large nonlinear optical constant d24 can be utilized, and the type II of phase matching between the laser beam 11, which serves as the fundamental wave, and its second harmonic 12 can be effected. As a result, the second harmonic 12 having the maximum intensity can be obtained. Also, as illustrated in detail in FIG. 6, the laser beam 11, which has been produced in the two longitudinal modes, is caused to impinge upon the KTP crystal 10 such that the two directions of linear polarization in the longitudinal modes may intersect approximately perpendicularly to each other and may respectively incline approximately 45° with respect to the Z axis. In such cases, as described above, longitudinal mode competition can be reduced, and the second harmonic 12, which is free of any noise, can be obtained.

However, if the phase difference $\Delta$ is caused to occur in the laser beam 11 by the KTP crystal 10, the directions of linear polarization of the laser beam 11 will change in accordance with the value of the phase difference $\Delta$. Therefore, it will often occur that the directions of linear polarization of the laser beam 11 illustrated in FIG. 6 cannot be obtained. How the directions of linear polarization of the laser beam 11 illustrated in FIG. 6 are obtained will be described hereinbelow.

The KTP crystal 10 is secured to a rotation shaft 30, which extends parallel to the Z axis. The rotation shaft 30 is supported on a support base 31 such that the rotation shaft 30 can rotate. An adjusting knob 33, which can rotate around a rotation shaft 32, is engaged with the support base 331. The rotation shaft 32 is coupled with the rotation shaft 30 via reduction gears. Therefore, when the adjusting knob 33 is rotated, the KTP crystal 10 can be rotated around the rotation shaft 30.

When the KTP crystal 10 is rotated in the manner described above, the length L of the optical path of the laser beam 11 in the KTP crystal 10 changes. If the length L of the optical path thus changes, the phase difference $\Delta$, which is caused to occur in the laser beam 11 by the KTP crystal 10, changes. As a result, the directions of linear polarization of the laser beam 11 change. Accordingly, by rotating the KTP crystal 10 little by little, the directions of linear polarization of the laser beam 11 illustrated in FIG. 6 can be obtained, and the second harmonic 12, which is free of any noise and has the maximum intensity, can be obtained. In cases where the temperatures of the KTP crystal 10 and the resonator are adjusted with a control accuracy falling within the range of $+0.1°$ C., noise in the second harmonic 12 can be kept below 1% (p-p).

Figure 8:
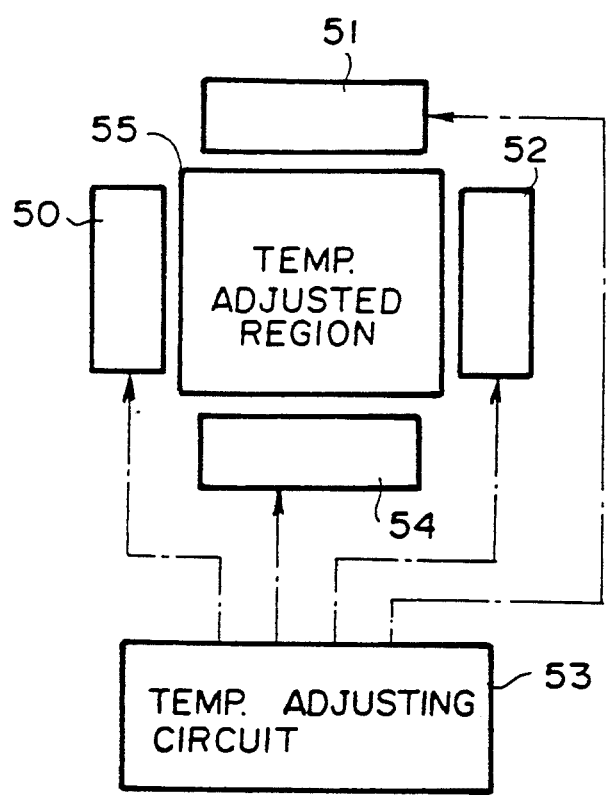
FIG. 8 is a schematic front view showing a different example or arrangement or temperature adjusting means in the optical wavelength converting apparatus in accordance with the present invention.

In order to obtain the second harmonic free of noise and drift more reliably, it is necessary for the accuracy, with which the temperatures of the KTP crystal 10 and the resonator are adjusted, to be increased. For this purpose, by way of example, as illustrated in FIG. 8, a temperature-adjusted region 55 (i.e, the KTP crystal 10 and the resonator) should preferably be surrounded by a plurality of Peltier devices 50, 51, 52, and 54, and the temperature of the temperature-adjusted region 55 should preferably be adjusted by the Peltier devices 50, 51, 52, and 54, and the temperature adjusting circuit 53. In the example of FIG. 8, the Peltier devices 50, 51, 52, and 54 surround the temperature-adjusted region 55 from upper, lower, left, and right sides. Specifically, the laser beam 11 serving as the fundamental wave travels in a direction that intersects the plane of the sheet of FIG. 8 and impinges upon the KTP crystal 10 located in the temperature-adjusted region 55.

In cases where the structure shown in FIG. 8 is employed, the accuracy, with which the temperatures of the KTP crystal 10 and the resonator are adjusted, can be kept within the range of ±0.01° C., particularly within the range Of approximately ±0.005° C. In this manner, fluctuations in the output of the second harmonic 12 can be kept below 0.3% (p-p).

In the embodiment of FIG. 1, the KTP crystal 10 is rotated in the direction such that the angle $\phi$ may change. Alternatively, the KTP crystal 10 may be rotated in a direction such that the angle $\theta$ or the angle $\psi$ may change. As another alternative, the KTP crystal 10 may be rotated in a direction such that all of the angle $\phi$, the angle $\theta$, and the angle $\psi$ may change. In order to keep the allowance of the adjustment of the phase difference $\Delta$ large, the KTP crystal 10 should preferably be rotated in a direction such that all of the angle $\phi$, the angle $\theta$, and the angle $\psi$ may change.

Figure 2:
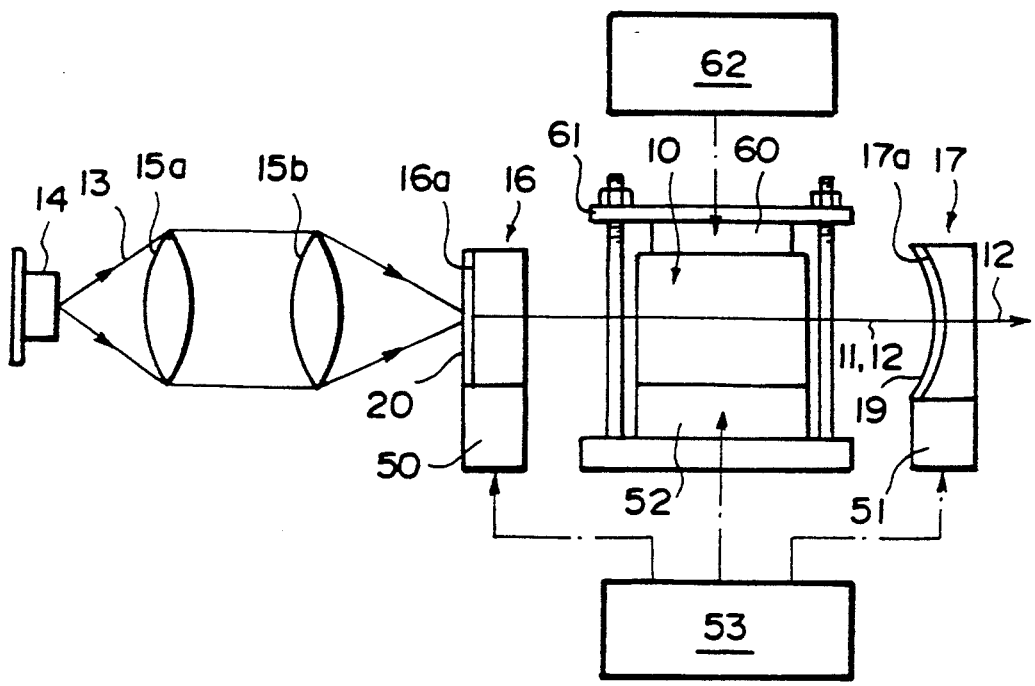
FIG. 2 is a side view showing a second embodiment of the optical wavelength converting apparatus in accordance with the present invention.

A second embodiment of the optical wavelength converting apparatus in accordance with the present invention will be described hereinbelow with reference to FIG. 2. In FIG. 2, similar elements are numbered with the same reference numerals with respect to FIG. 1. (This also applies to FIG. 3.)

In the embodiment of FIG. 2, the KTP crystal 10 is located such that it is in contact with a piezo-electric device 60, which is secured to a holder 61. An electric power source 62 applies a voltage to the piezo-electric device 60. The value of the applied voltage can be changed appropriately such that the magnitude of a stress applied to the KTP crystal 10 may be changed.

When the magnitude of the stress applied to the KTP crystal 10 is changed in the manner described above, the refractive indexes represented by Formula (13) change. As a result, the phase difference $\Delta$ changes Therefore, by the application of the stress having an appropriate magnitude to the KTP crystal 10, the directions of linear polarization of the laser beam 11 illustrated in FIG. 6 can be obtained.

A third embodiment of the optical wavelength converting apparatus in accordance with the present invention will be described hereinbelow with reference to FIG. 3.

Figure 3:
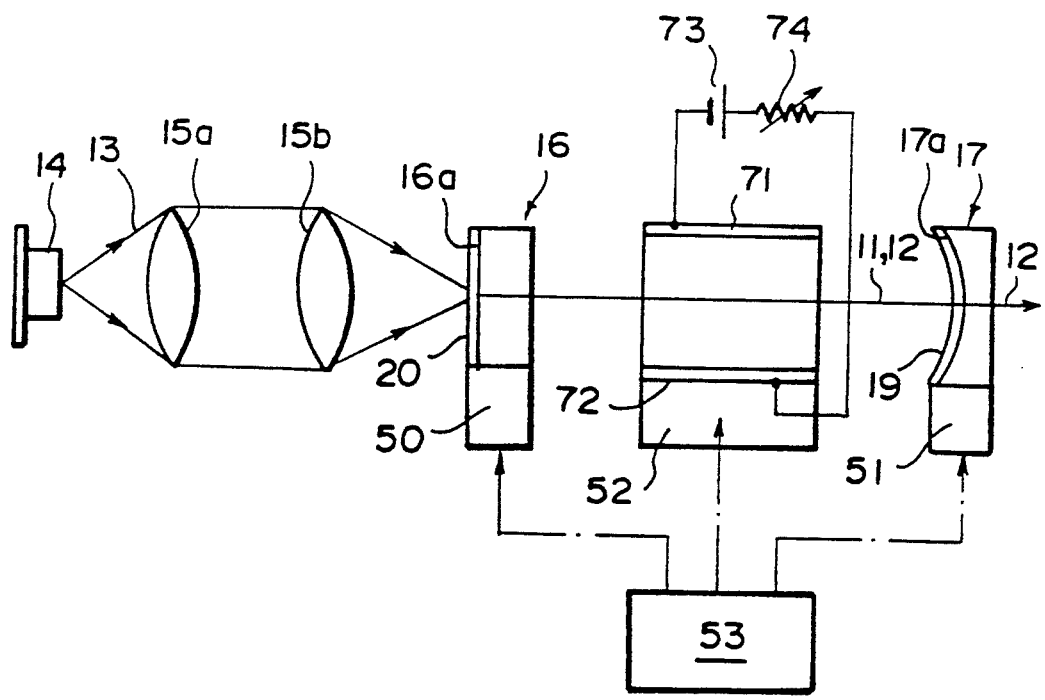
FIG. 3 is a side view showing a third embodiment of the optical wavelength converting apparatus in accordance with the present invention.
Figure 4:
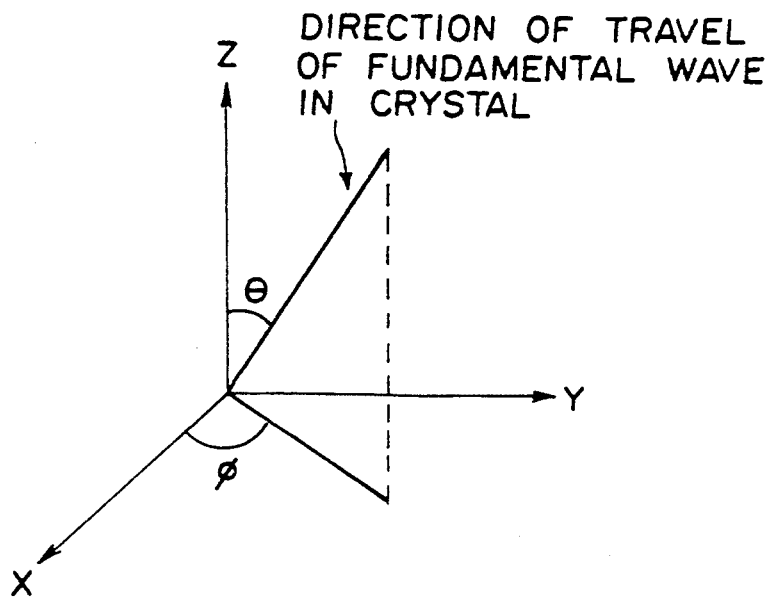
FIG. 4 is an explanatory view showing an angle $\theta$ between the direction of travel of a fundamental wave in a crystal and an optic axis Z, and an angle $\phi$ between the direction of travel of the fundamental wave and an optic axis X.
Figure 5:
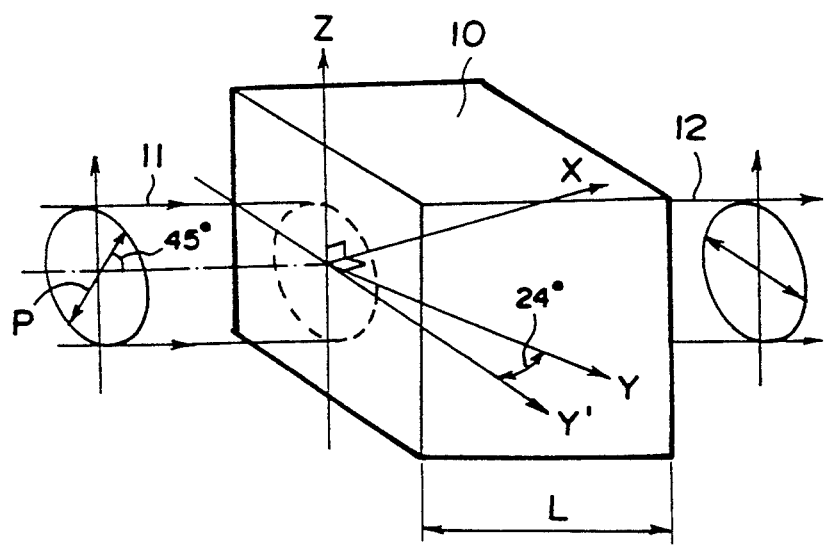
FIG. 5 is an explanatory view showing the relationship between optic axes of a nonlinear optical material and the direction of linear polarization of a fundamental wave.

In the embodiment of FIG. 3, electrodes 71 and 72 are located on two surfaces of the KTP crystal 10, which surfaces stand facing each other. An electric power source 73 is connected to the electrodes 71 and 72 in order to apply a voltage across the KTP crystal 10. The value of the applied voltage can be adjusted by operating a variable resistor 74. When the voltage is applied across the KTP crystal 10 in this manner, the refractive indexes represented by Formula (13) change due to electro-optic effects. As a result, the phase difference $\Delta$ changes. Therefore, by the application of an appropriate level of voltage across the KTP crystal 10, the directions of linear polarization of the laser beam 11 illustrated in FIG. 6 can be obtained.

In the three embodiments described above, a means for changing the state of the KTP crystal 10 is employed as the means for adjusting a difference in phase. Alternatively, a means which is independent of the nonlinear optical crystal, such as a quarter-wave plate or an etalon plate, may be employed as the means for adjusting a difference in phase. However, in cases where a quarter-wave plate or an etalon plate is employed, resonator loss increases, or dust, or the like, remaining in the optical wavelength converting apparatus clings to surfaces of optical parts by electrostatic attraction, or the like. As a result, the output power of the second harmonic will decrease. The means for adjusting a difference in phase by changing the state of the nonlinear optical crystal is free of such problems and is, therefore, advantageous over the aforesaid means which is independent of the nonlinear optical crystal, such as a quarter-wave plate or an etalon plate.

What is claimed is:

1. An optical wavelength converting apparatus in which a laser beam serving as a fundamental wave and having been obtained by pumping a solid laser medium is caused to impinge upon a nonlinear optical crystal, the type II of phase matching between the fundamental wave and its second harmonic is effected, and the second harmonic of the fundamental wave is thereby radiated out of the optical wavelength converting apparatus, wherein a solid laser medium, which produces a linearly polarized fundamental wave in two longitudinal modes, is employed as said solid laser medium, and a means for adjusting a difference in phase of said fundamental wave due to said nonlinear optical crystal and a means for adjusting the temperatures of said nonlinear optical crystal and a resonator, such that said temperatures may be kept at predetermined values, are provided in order to work such that two directions of polarization of said fundamental wave may intersect approximately perpendicularly to each other and may respectively incline approximately 45° with respect to an optic axis of said nonlinear optical crystal.

2. An apparatus as defined in claim 1 wherein said solid laser medium is a YVO$_4$ crystal doped with approximately 1 to 2 at % of neodymium.

3. An apparatus as defined in claim 1 wherein said means for adjusting a difference in phase is a means, which rotates said nonlinear optical crystal around an axis, which extends in a direction that intersects an optical path of said fundamental wave in said nonlinear optical crystal, and thereby changes the length of the optical path of said fundamental wave in said nonlinear optical crystal.

4. An apparatus as defined in claim 1 wherein said means for adjusting a difference in phase is a means, which applies a stress to said nonlinear optical crystal.

5. An apparatus as defined in claim 4 wherein said means which applies a stress to said nonlinear optical crystal is composed of a piezo-electric device, which is located such that it is in contact with said nonlinear optical crystal, and an electric power source for applying a voltage to said piezo-electric device.

6. An apparatus as defined in claim 1 wherein said means for adjusting a difference in phase is a means, which applies a voltage across said nonlinear optical crystal.

7. An apparatus as defined in claim 1 wherein said means for adjusting the temperatures of said nonlinear optical crystal and a resonator is composed of Peltier devices and a temperature adjusting circuit, which is connected to said Peltier devices.

8. An apparatus as defined in claim 7 wherein said Peltier devices surround said nonlinear optical crystal and said resonator.

9. An apparatus as defined in claim 1 wherein a pumping source for pumping said solid laser medium is a semiconductor laser.

10. An apparatus as defined in claim 1 wherein said nonlinear optical crystal is located inside of said resonator.

11. An apparatus as defined in claim 1 wherein said nonlinear optical crystal is a KTP crystal.

* * * * *